US010929865B2

(12) United States Patent
Johnson et al.

(10) Patent No.: US 10,929,865 B2
(45) Date of Patent: Feb. 23, 2021

(54) DYNAMIC INCENTIVE GENERATOR

(71) Applicant: INTERNATIONAL BUSINESS MACHINES CORPORATION, Armonk, NY (US)

(72) Inventors: Benjamin L. Johnson, Baltimore, MD (US); Florian Pinel, New York, NY (US); Donna K. Byron, Petersham, MA (US); Carmine Dimascio, West Roxbury, MA (US); Christie Ewen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 16/205,338

(22) Filed: Nov. 30, 2018

(65) Prior Publication Data
US 2020/0175540 A1 Jun. 4, 2020

(51) Int. Cl.
*G06Q 30/02* (2012.01)
*G06N 7/00* (2006.01)

(52) U.S. Cl.
CPC ........ *G06Q 30/0224* (2013.01); *G06N 7/005* (2013.01)

(58) Field of Classification Search
None
See application file for complete search history.

(56) References Cited

U.S. PATENT DOCUMENTS

| 7,228,285 | B2 * | 6/2007 | Hull .................... G06Q 20/387 705/14.23 |
| 9,715,700 | B2 | 7/2017 | Chomsky et al. |
| 2005/0131761 | A1 | 6/2005 | Trika et al. |
| 2009/0006183 | A1 | 1/2009 | Paintin et al. |
| 2011/0153403 | A1 * | 6/2011 | Postrel .................. G06Q 30/02 705/14.29 |
| 2013/0041759 | A1 * | 2/2013 | Mikan ................ G06Q 30/0269 705/14.66 |
| 2013/0046634 | A1 | 2/2013 | Grigg et al. |

(Continued)

OTHER PUBLICATIONS

Andreu Pere Isern-Deya et al., "A Secure Multicoupon Solution for Multi-Merchant Scenarios", 2011, International Joint Conference of IEEE TrustCom-11, p. 655-663 (Year: 2011).*

(Continued)

*Primary Examiner* — John Van Bramer
(74) *Attorney, Agent, or Firm* — Patrick J. Daugherty; Daugherty & Del Zoppo Co., LPA

(57) ABSTRACT

Embodiments provide dynamic consumer incentive generation by generating a combination discount offer that provides a total discount value to a customer in response to verifying that the customer executes a commercial activity at each of different (first and second) ones of a discount grouping plurality of businesses, in response to determining that it is probable as a function of historic purchasing data that the customer will purchase an item from the first business when they make a purchase from the second business; and allocating different portions of the total discount value as costs to the first and second businesses that have different values determined as a function of a difference between a first probability that the customer will purchase an item from the first business and a second probability that the customer will purchase an item from the second business.

13 Claims, 6 Drawing Sheets

(56) References Cited

U.S. PATENT DOCUMENTS

| | | |
|---|---|---|
| 2013/0073361 A1 | 3/2013 | Silver |
| 2013/0159077 A1 | 6/2013 | Stringfellow et al. |
| 2013/0262227 A1 | 10/2013 | Lin et al. |
| 2013/0317893 A1* | 11/2013 | Nelson ............... G06Q 20/0855 |
| | | 705/14.5 |
| 2014/0129313 A1* | 5/2014 | Rappoport ......... G06Q 30/0224 |
| | | 705/14.25 |
| 2014/0236672 A1 | 8/2014 | Yoder et al. |
| 2015/0039413 A1 | 2/2015 | Mesika et al. |
| 2015/0106183 A1 | 4/2015 | McEvilly et al. |

OTHER PUBLICATIONS

Peter Mell et al, The NIST Definition of Cloud Computing, National Institute of Standards and Technology, Publication 800-145, 2011, entire document.

* cited by examiner

DYNAMIC INCENTIVE GENERATOR

BACKGROUND

A coupon is a marketing vehicle wherein a ticket, unique code or document can be redeemed for a financial discount (reduction in offer or acceptance price) or a rebate (return of a portion of a purchase price) to the benefit of a consumer when purchasing a product (goods or services). Coupons are commonly used by manufacturers of packaged goods or by retailers or service locations as a part of sales promotions.

A rebate is an amount paid by way of reduction, return, or refund on what has already been paid or contributed. Rebates are commonly used by marketers as incentives or supplements to product sales, and may encompass a variety of payout options to consumers, including a paper check, prepaid retailer cards having value toward purchases at certain retailers, and credit card and other financial account reimbursement credits.

Coupons and rebates can be targeted selectively to localized or regional markets in which price competition is great, or to acquire high-valued consumers as repeat customers, wherein the cost of the discount or rebate amount is anticipated to be less than the net revenue realized from the consumer, either in the present transaction, or over a number of anticipated future transactions that are likely to occur in response to establishing a consumer relationship with the benefitting customer.

A social network is a social structure made up of a set of social actors (such as individuals or organizations), sets of dyadic ties, and other social interactions between actors. A social networking or social media service or site is an online platform which people use to build social networks or social relations with other people who share similar personal or career interests, activities, backgrounds or real-life connections. Social networking service applications may incorporate a range of information and communication tools, and operate (execute) on a variety of different programmable devices (desktop and on laptop computers, tablet computers, smartphones and other mobile devices, etc.)

Social networking sites enable users to engage with each other in marketing and purchasing activities: for example, to publish and share coupons, wherein the user sharing a coupon receives a reward when a social contact uses the shared coupon. The Internet and other wide area network (WAN) structures enable social networking applications to connect users in real-time to others in different geographic locations spanning across the world. Thus, a user engaged in a discounted purchase of goods or services may share the purchase information with their social network connections (contacts, friends, family, business or school colleagues or alumni, etc.). Each of the linked contacts is then potentially or immediately informed of the purchase, and such information may be useful to their own purchasing decisions, wherein the purchase of a friend functions as a recommendation over competing products, resulting in the contact viewing the purchased item, and even adding the item to their own wish-list or electronic shopping.

SUMMARY

In one aspect of the present invention, a computerized method includes executing steps on a computer processor. Thus, a computer processor is configured to generate a combination discount offer that provides a total discount value to a customer in response to verifying that the customer executes a commercial activity at each of different (first and second) ones of a discount grouping plurality of businesses, in response to determining that it is probable as a function of historic purchasing data that the customer will purchase an item from the first business when they make a purchase from the second business. The configured processor further allocates a first portion of the total discount value as a first cost to the first business and a second portion of the total discount value as a second cost to the second business, wherein the first portion and the second portion have different values that are determined as a function of a difference in value between a first probability that the customer will purchase an item from the first business and a second probability that the customer will purchase an item from the second business.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to generate a combination discount offer that provides a total discount value to a customer in response to verifying that the customer executes a commercial activity at each of different (first and second) ones of a discount grouping plurality of businesses, in response to determining that it is probable as a function of historic purchasing data that the customer will purchase an item from the first business when they make a purchase from the second business. The configured processor further allocates a first portion of the total discount value as a first cost to the first business and a second portion of the total discount value as a second cost to the second business, wherein the first portion and the second portion have different values that are determined as a function of a difference in value between a first probability that the customer will purchase an item from the first business and a second probability that the customer will purchase an item from the second business.

In another aspect, a computer program product for dynamic consumer incentive generation has a computer-readable storage medium with computer readable program code embodied therewith. The computer readable program code includes instructions for execution which cause the processor to generate a combination discount offer that provides a total discount value to a customer in response to verifying that the customer executes a commercial activity at each of different (first and second) ones of a discount grouping plurality of businesses, in response to determining that it is probable as a function of historic purchasing data that the customer will purchase an item from the first business when they make a purchase from the second business. The processor is further caused to allocate a first portion of the total discount value as a first cost to the first business and a second portion of the total discount value as a second cost to the second business, wherein the first portion and the second portion have different values that are determined as a function of a difference in value between a first probability that the customer will purchase an item from the first business and a second probability that the customer will purchase an item from the second business.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
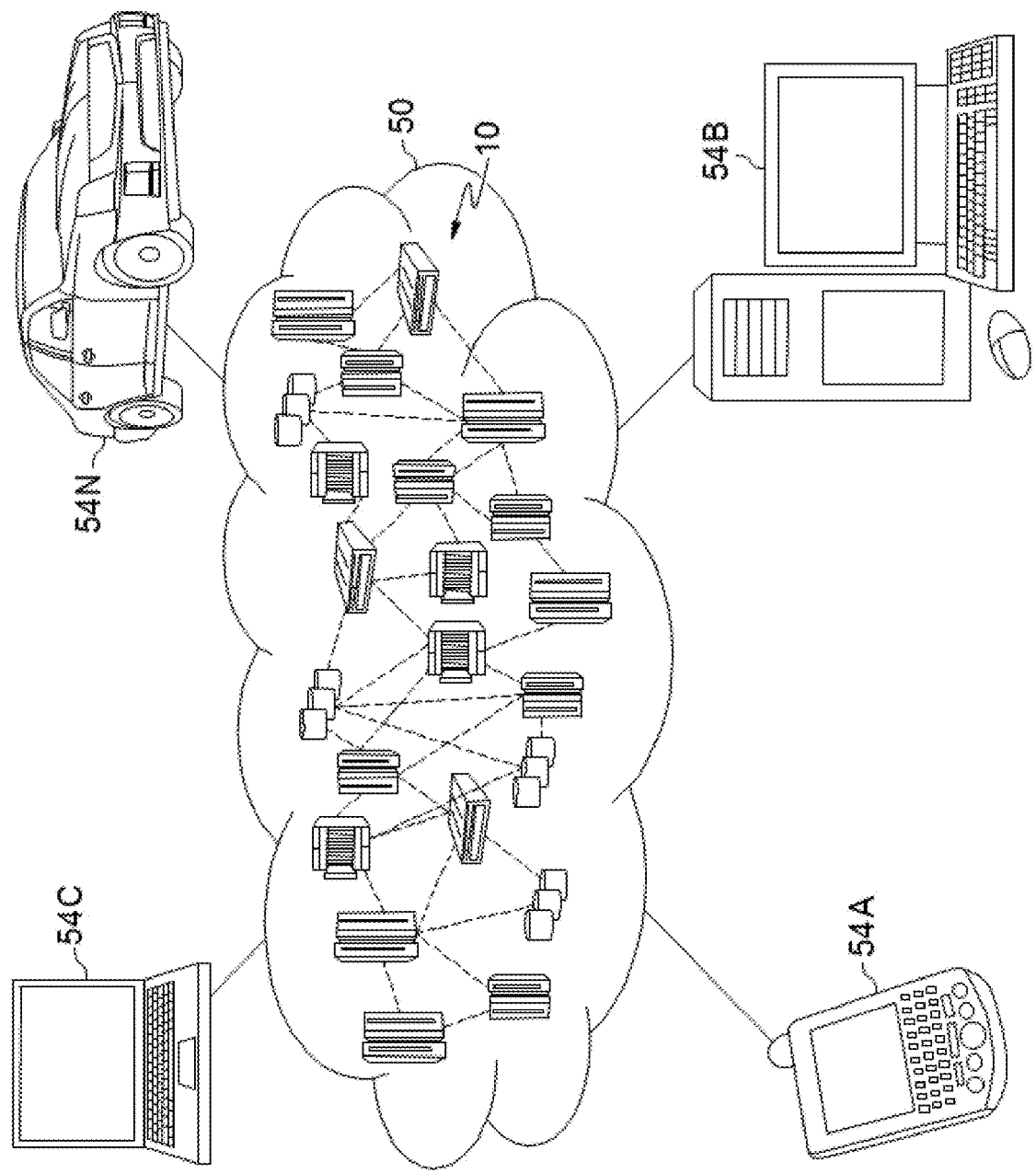
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
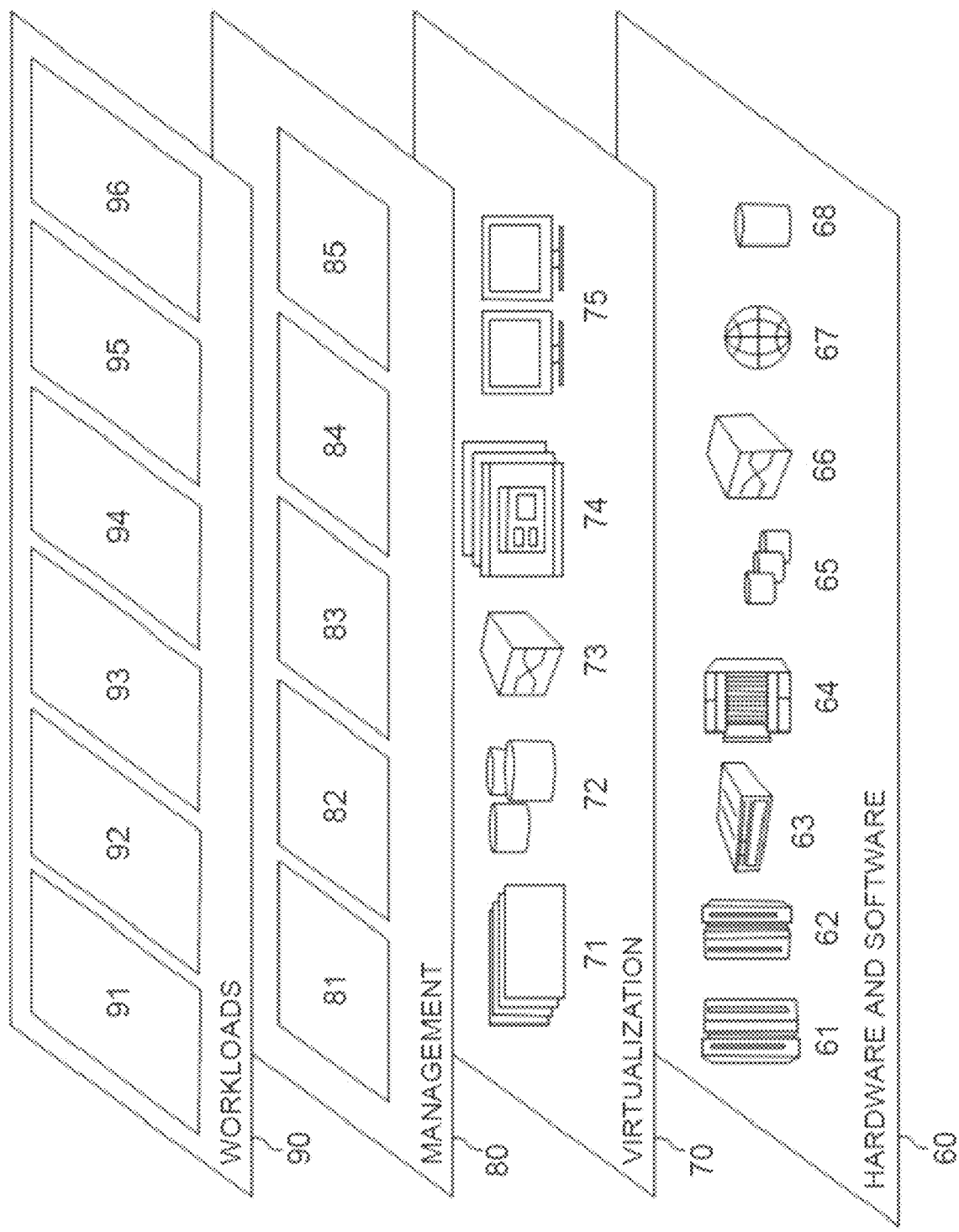
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for dynamic consumer incentive generation according to aspects of the present invention 96.

Figure 3:
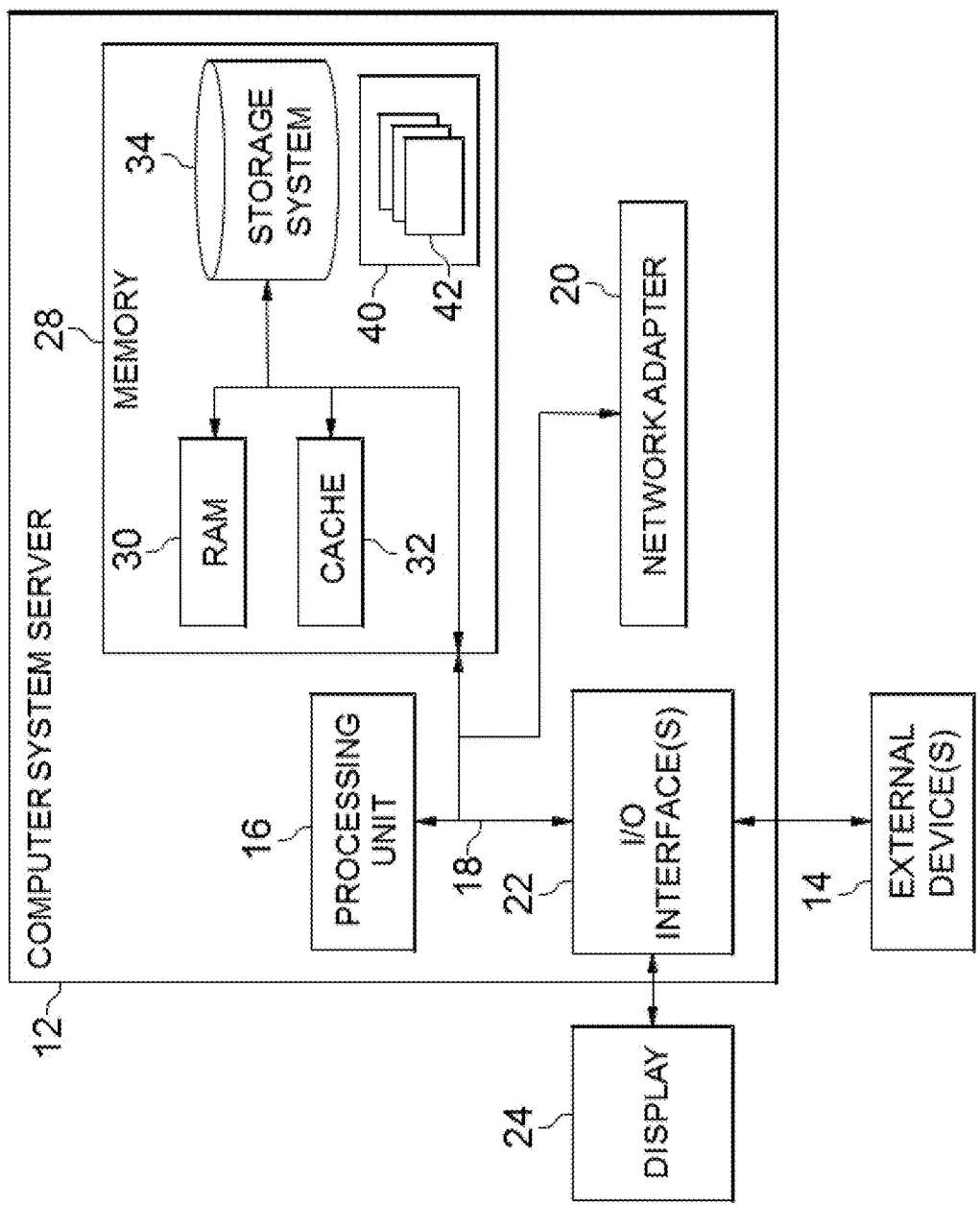
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

Figure 4:
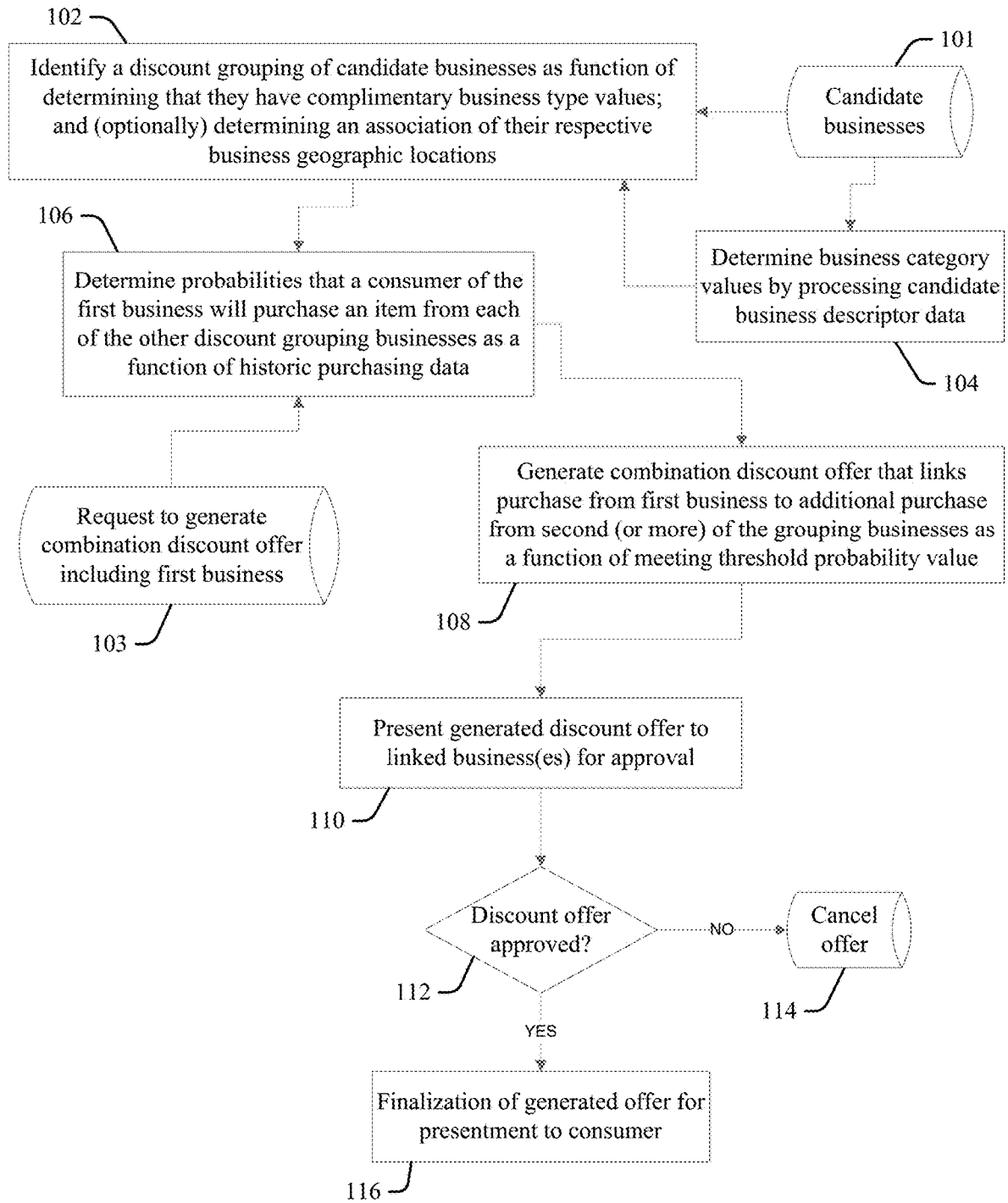
FIG. 4 is a flow chart illustration of an embodiment of the present invention.

FIG. 4 illustrates a system, process or device according to one embodiment of the present invention. At 102 a device processor configured according to the present invention (the "configured processor") identifies a discount grouping (subset) of a larger group of candidate businesses 101 as a function of determining that they have complementary business type or category values; and in some embodiments, also as a function of determining a link or association of their respective business geographic locations.

Business category values used in creating the discount grouping at 102 may be self-reported and populated by business owners or representatives. In some embodiment the business candidate type or category values are determined directly by the configured processor at 104 by processing business descriptor data (for example, by applying textual analysis or machine learning models to business names, description, images, business entity metadata or other data that is descriptive of each of the candidate businesses 101. For example, the configured processor may determine at 104 age limits on admission to entertainment venues or a featured movie or show, or minimum age entry requirements for a night club, and use this data in defining the discount grouping at 102.

Determining a link or association of their respective business geographic locations may include at 102 determining that they are located within a common physical place or area, such as a shopping mall, on a same street within a block or other designated longitudinal boundary range along the street, or within a defined, local business district, etc. In some aspects, determining a link or association of respective business geographic locations includes determining that they are each located along, or proximate to, a current or projected/predicted travel route of a consumer. For example, some embodiments define discount business groupings as those on or proximate to (within a maximum travel time or distance from the route) a route plotted a destination within a mapping search entered by a consumer. Thus, rather than limiting the groupings to nearby locations, aspects extend the scope and reach of the grouping to include businesses on a particular travel route, using GPS and route planning applications, wherein determining a "nearby" condition for inclusion into the grouping is a function of proximity to the travel route.

Determining that businesses have complementary business type value at 102 includes comparing goods or service descriptors to a defined set of a complementary business activity types of categories, wherein a customer is likely to purchase goods or service from multiple ones of the complementary business types in association with a single purchasing event from any one of the complementary businesses, including as a function of an attribute of a candidate consumer. Determining that businesses have complementary business type values at 102 may be based on knowledge base data that indicates what business purchases are commonly linked or related in consumer purchasing events (for example, from determinations that a consumer might want to watch a movie while their car is being serviced, or that a consumer is likely to go shopping for clothes after purchasing barber or hair-styling services, etc.). Illustrative but not limiting or exhaustive examples of linked business purchases include babysitting services, restaurants, theaters and arenas and other mass assembly event venues, and parking lots that are linked to together as complementary for a couples-night out events; and wherein a retail shopping store may be added to the same, exemplary group for a family shopping trip to a mall.

Geographic location relationships considered at 102 may also be based on business association rules learned from location data collected by social networking, travel, credit card and cash account purchase records and other applications. For example, the configured processor may map location data points of a given consumer to businesses they have patronized, and to other businesses within a same area, grouping them together.

Where the grouping at 102 is based on an attribute of the candidate consumer, a grouping may limit babysitting services to those offering infant and toddler care where older children are more likely to be included in and take part in the event, for example, for a candidate attending a museum. Similarly, theater or assembly venues may be limited to those presenting family-friendly entertainment at the time of an event, wherein the candidate consumer is a family on a shopping trip to a mall having movie theaters.

At 106, in response to an input (request) 103 to generate a combination discount offer that includes one (a first) of the discount grouping businesses, the configured processor determines probabilities that a consumer of the first business will purchase an item (goods or services) from each of the other discount grouping businesses when they make a purchase from the first business, a function of considering historic purchasing data. In some embodiments, the configured processor considers historical data generated from discounts involving similar businesses, generated the probabilities for each of the grouping businesses based on estimated revenue and discount costs generated by the discount for each participant as determined within the historical data.

At 108 the configured processor autonomously generates a combination discount offer that links a purchase from the first business to an additional purchase from at least one other (a second, third, etc.) of the grouping businesses that each have threshold probabilities that the consumer of the first business will purchase an item from the other, linked businesses. Thus, the generated discount offer automatically includes linked, participating businesses based on historic purchasing activity directed to linked types within discount offer performance history of consumers, based on the performance of past discounts involving similar types of businesses.

At 110 the configured processor (optionally) presents the generated discount offer to each (or to key members) of the linked (first, second, etc.) businesses for their approval (to accept or reject the discount offer proposal, wherein finalization of the offer for presentment to a consumer at 116 is dependent upon each (or a majority, or a key business, etc.) approving the discount offer at 112, else the process is terminated at 114.

However, some embodiments omit the steps 110, 112, 114 and 116, wherein the businesses within the discount offer are not required to approve (or given an opportunity to opt out of) the generated discount offer, wherein the offer generated at 108 is finalized and ready for presentment to consumers.

Embodiments of the present invention may generate a discount offer at 108 to include a variety of conditions. For example, the offer may require the consumer to execute purchases at specific, designated ones (of types) of the listed businesses, or all of the businesses; or, a purchase at any one, or subset (for example, "any two") of the listed businesses (or types thereof) may qualify the consumer for the discount. In another example, the offer generated at 108 includes constraints on the purchased products: for example, a consumer may be required by the offer to use an item purchased at one of the businesses in executing another purchase at another of the grouping businesses, in order to meet the terms of a discount offer.

In some embodiments a combination discount is generated at 108 that is expressed as a dollar amount or a percentage of a consumer's total spending across all of a listed plurality of the business grouping, as participating businesses, wherein the discount is rebate amount returned to the consumer (including one specific to purchase of identified goods or services), of a cash reward (credit card account credit, gift card issuance, etc.).

Figure 5:
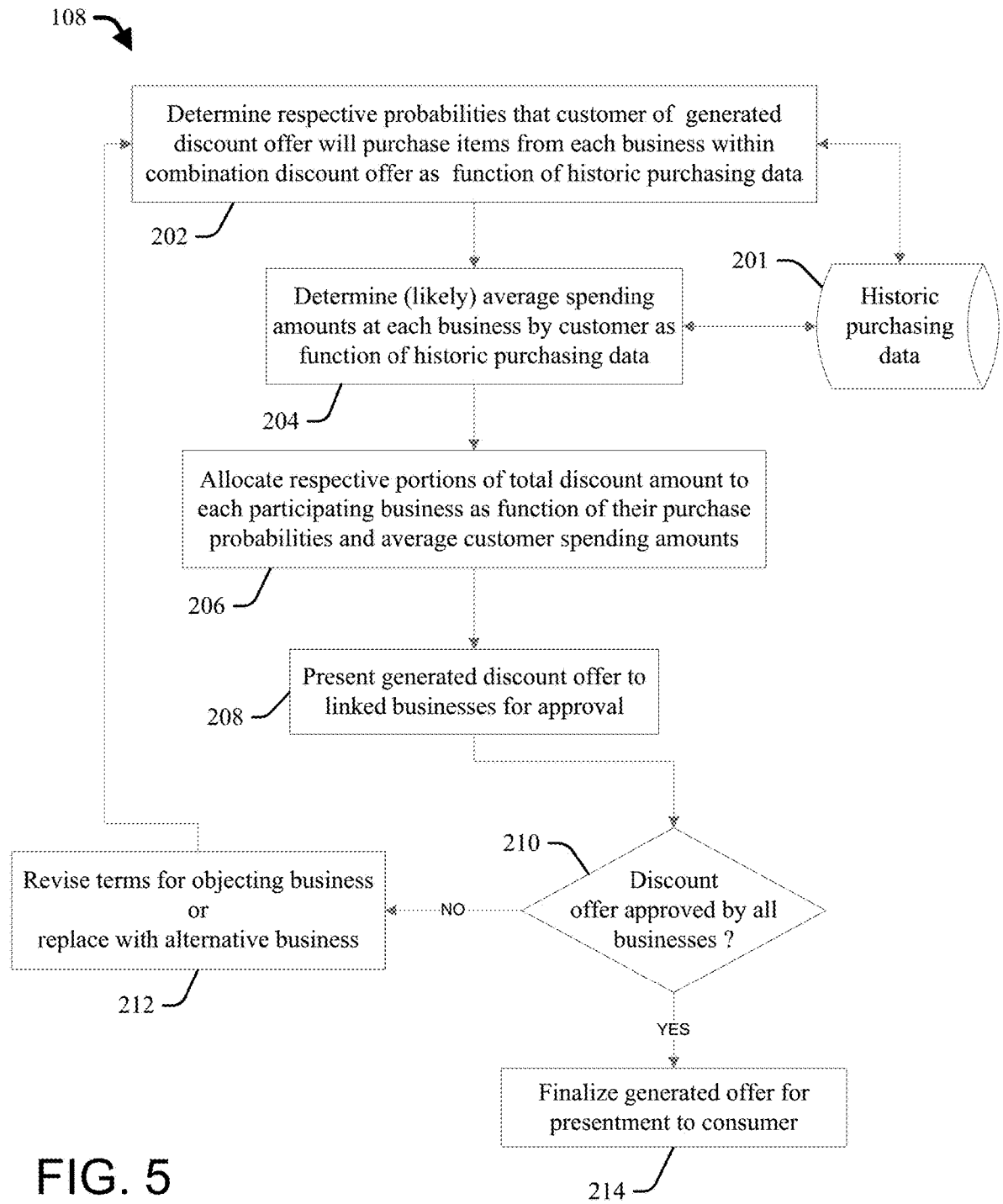
FIG. 5 is a flow chart illustration of another embodiment of the present invention.

FIG. 5 illustrates another embodiment of the present invention that automatically calculates the portion or fraction of the discount that each participating business that is linked within a generated combination discount offer is responsible for paying. Thus, at 202 a processor configured according to the present invention (the "configured processor") determines the respective "purchase" probabilities that a customer using the discount offer will purchase items from each of the businesses linked by a combination discount offer generated at 108, FIG. 4, as a function of historic purchasing data 201. The data source 201 may be a database stored on a local or networked memory device, or the data may be a data service or repository provided remotely (for example, in a cloud structure).

At 204 the configured processor determines (or predicts likely) average spending amounts (per visit, purchase, or aggregated over a time period, etc.) at each of the linked businesses by the customer (or type of customer) as a function of the historic purchasing data 201.

At 206 the configured processor allocates respective portions (fractions) of the total discount amount defined by the combination discount offer to each participating business (that they are responsible for assuming) as a function of their respective probabilities that the customer will purchase items from each business determined at 202, and their respective customer averaging spending amounts determined at 204.

Some embodiments provide opportunities for the linked businesses to review, approve, revise or reject their allocated portions before the generated combination offer is finalized. Thus, each business can review the amount of the discount allocated to their responsibility before deciding whether to take part in the generated discount offer. Accordingly, at 208 the configured processor presents the shared discount amounts to each of the business participating in the (proposed) combination discount offer, and at 210 determines whether each of the businesses approves (accepts) the allocated shares.

In response to a rejection by one or more of the businesses, at 212 the configured processor adjusts the share allocations (for example, in response to a requested revision from one of the businesses); or replaces a rejecting business with an alternative business of a similar type or category (for example, in response to a rejection by a restaurant at 210, the configured processor selects another restaurant as a replacement). The process then returns to 202 to recalculate the discount offer terms and cost allocations, for presentment at 208.

Upon acceptance of the allocated costs by all of the participating businesses at 210, the configured processor finalizes the discount for presentment to candidate consumers at 214.

In one example the configured processor uses the following Equation [1] at 206 to compute the contributions of a first business, "Business A", that is linked in the generated discount offer with a second business, "Business B":

$$f(A)=c(A)p(B)/(c(A)p(B)+c(B)p(A)) \qquad [1]$$

wherein "p(A)" and "p(B)" are the respective probabilities that a consumer will purchase an item from either when they engage with and purchase an item from any of the businesses within the discount offer grouping; and "c(A)" and "c(B)" are the respective average spending amount values per customer observed in (or predicted from) the historic data; and wherein the fraction of the discount paid by Business A is defined by the value of f(A).

For example, Business A is a parking lot that's used by 100% of the customers of a mall, and accordingly, "p(A)=1." Business B is a restaurant where 1% of the mall's customers have lunch ("p(B)=0.01"). The average parking cost (gross revenue) realized by Business A is $10 per car ("c(A)=10").

The average restaurant check amount realized by Business B is $20 ("c(B)=20"). Using Equation [1], the fraction of the discount paid by Business A (value of "f(A)") is 0.5% of the discount, and the fraction of the discount paid by Business B (value of "f(B)") is the remainder (99.5% of the discount), wherein the restaurant pays most of the discount.

In another, alternative example or embodiment the configured processor uses the following Equation [2] at 206 to compute the contributions Business A and Business B:

$$f(A)=g(c(A),p(B))/(g(c(A),p(B))+g(c(B),p(A))) \quad [2]$$

wherein "g" is a function selected or configured to optimize certain metrics (for example, a discount acceptance rate, and still other functions will be apparent to one skilled in the art).

Functions used to allocate respective shares of a discount offer at 206 may be generalized for discounts involving more than two businesses. In some embodiments, threshold rules are applied that stipulate that a discount amount paid by any given business may not exceed amounts spent by the customer at that business (for example, on a an average or time-period aggregate basis.

Figure 6:
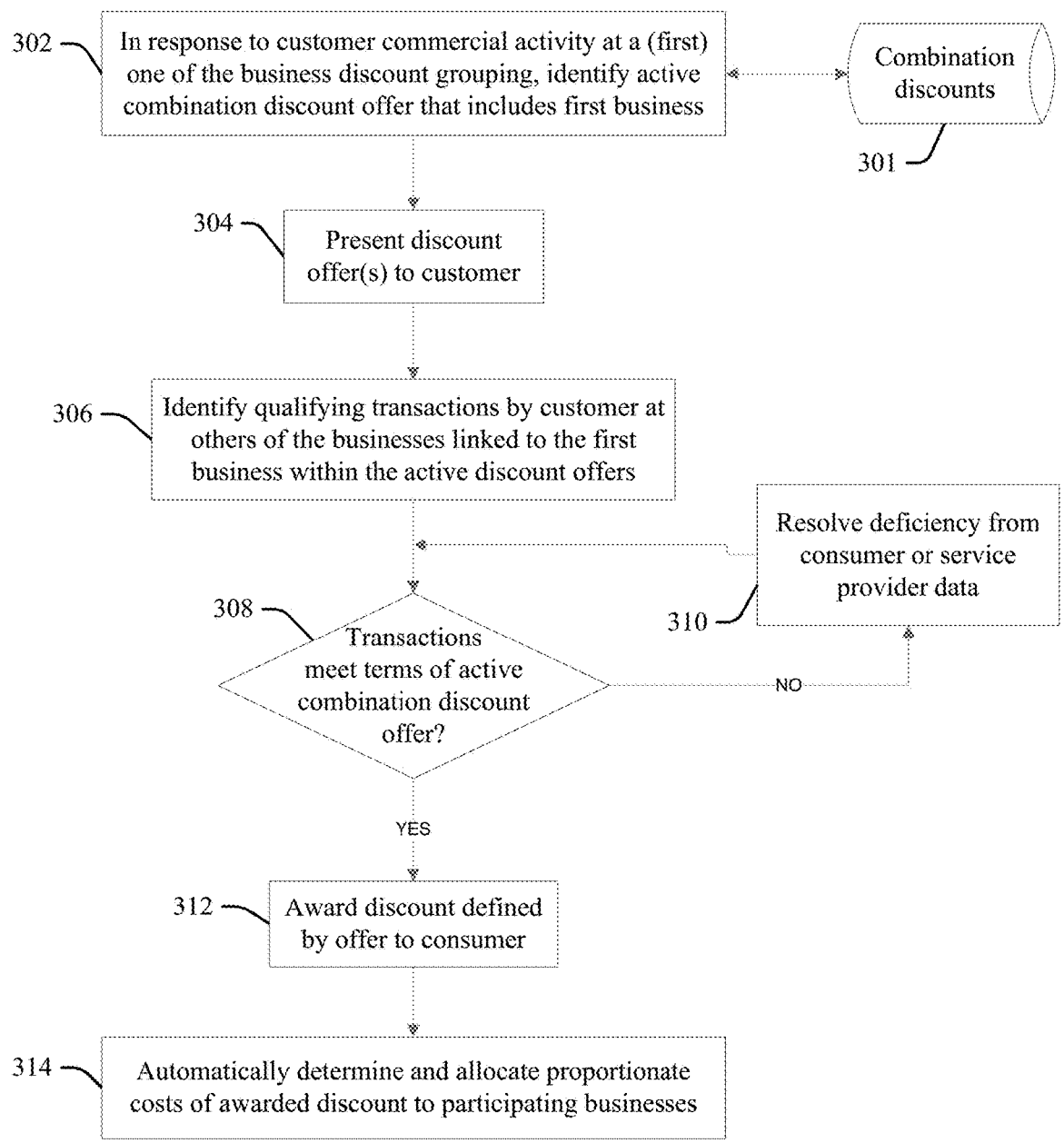
FIG. 6 is a flow chart illustration of another embodiment of the present invention.

FIG. 6 illustrates an application of an embodiment of the present invention. In response to a customer engaging in some type of commercial engagement or transaction activity at a (first) one of the businesses of the discount grouping as determined at 102 of FIG. 4 (for example, a social network service "check in" at the business location, making or fulfilling a reservation at a restaurant, agreeing to pay for parking upon entry into a parking facility, entering a store, purchasing a ticket to an event (movie, concert, etc.), etc.), at 302 a device processor configured according to the present invention (the "configured processor") searches a combination discount data source 301 (database on a local or network or cloud resource device or service, etc.) and identifies at least one active (non-expired) combination discount offer generated at 108 of FIG. 4 that includes the (first) business.

At 304 the configured processor presents the discount offer(s) to the checked-in customer. Illustrative but not limiting or exhaustive examples of presenting a discount at 304 includes driving a receipt generator to display the discount on (or within) a receipt generated from an item purchase by the customer at the checked-in business, and pushing a message to a mobile device of the customer.

At 306 the configured processor identifies (searches for, retrieves, collects, etc.) qualifying transactions (purchases, sampling, checking-in activity, etc.) by the checked-in customer at others of the businesses that are linked to the first business within the presented, active discount offers.

At 308 the configured processor determines if the transactions found at 306 meet the terms of one of the active combination discount offers: for example, the configured processor determines whether the customer submitted proper or adequate proofs of purchase or otherwise satisfies all the conditions of a generated combination discount offer.

In response to finding a deficiency at 308, at 310 the configured processor resolve the deficiency: for example, prompting the consumer to scan additional receipts into a mobile app, or register a credit card or financial account with a discount service provider, wherein the configured processor may directly obtain vendor or reported transaction data in order to resolve the deficiency or otherwise verify each of the linked transactions involving different ones of the linked businesses.

Accordingly, in response to verifying that the consumer has complied with the terms of the combined discount offer at 308 (for example, that they have purchased items from each of the businesses listed or linked by the generated offer, etc.), at 312 the configured processor awards the total discount defined by the offer to the consumer (issues a rebate, credits a financial account sends a gift card of the total amount, etc.); and at 314 automatically determines and allocates the portions, shares or fractions of the cost of the discount awarded to the consumer to each of participating businesses within the offer, pursuant to the cost-sharing mechanism(s) defined (at 206, FIG. 5) for the active and satisfied combination discount offer.

Many businesses located proximate to each in a similar geographic location, or otherwise accessible by a consumer in the course of engaging in a commercial transaction with others of the business, are non-competitive, and would benefit from additional consumer activity or traffic generated from the engagement of a consumer with a nearby businesses. For example, a movie theater may draw crowds for a new film, and nearby restaurants are ideal locations for a meal before or after the movie.

In the prior art businesses generally formulate mutually beneficial customer incentives (coupons, etc.) through explicit collaboration and agreement. For example, a parking garage may agree to provide a discount on parking if you have your ticket validated by a local business. Problems arise in efficiently identifying, formulating and implementing these types of discount agreements.

Aspects of the present invention provide advantages over, and cure deficiencies in, the prior art generation of coupons or incentives that combine the services of multiple businesses. By understanding what activities are available at which businesses (through automated analysis of business name descriptors and metadata, and social network and purchasing activity and history of consumers), aspects of the present invention determine which business offerings and activities are compatible with each other with respect to consumer behavior, wherein participating business for creating a combination discount offer are recommended automatically (based on their activities, coupon performance history, etc.)

Embodiments provide for the automatic and proportionate distribution of discount costs between participants based on frequentation probabilities, statistics and relative customer spending behaviors, and therefore on objective standards that equitably balance the costs between the different businesses based on actual or predicted consumer behavior. This is contrasted to prior art combination offer generation or management, wherein offers tend to be created on an ad-hoc, qualitative or subjective basis, and wherein costs may be unfairly allocated among the businesses due to mismatches in negotiating leverage or power between the different businesses.

Embodiments need not determine the primary motive that drove a consumer to go to the restaurant and to a movie theater in the same evening: Did the consumer go to the restaurant because they were already planning to go to the movies, or, instead, did the consumer go to the movies because they were already planning to go out to a restaurant? While the prior art made need to make this determination to fairly allocate the costs of a combination discount, aspects of the present invention agnostically allocate the costs based on objective consumer behavior (respective differences in engagement probability and/or total spending or opportunity costs, etc.)

What is claimed is:

1. A computer-implemented method, comprising:
a first computing node determining a plurality of discount grouping subset businesses type values by applying textual analysis to text data descriptive of a plurality of candidate businesses, and defining a discount grouping plurality of businesses as a subset of the plurality of candidate businesses that each have complementary business type values as a function of determining common linkages to purchase data values of the determined business types within consumer purchasing event knowledge base data; and
a second computing node that is linked to the first computing node within a computing environment:
generating a combination discount offer that provides a total discount value to a customer in response to verifying that the customer executes a commercial activity at each of a first business and a second business of the discount grouping plurality of businesses, and in response to determining that it is probable as a function of historic purchasing data that the customer will purchase an item from the first business when they make a purchase from the second business;
determining average spending amounts at each of the first and the second businesses by the customer as a function of the historic purchasing data;
determining a first portion of the total discount value in an amount "f(A)" according to the expression "f(A)=c(A) p(B)/(c(A) p(B)+c(B) p(A))", wherein "p(A)" is a first probability that the customer purchases an item from the first business when the customer purchases an item from the second business, "p(b)" is a second probability that the customer purchases an item from the second business when the customer purchases an item from the first business, "c(A)" is the determined average spending amount at the first business by the customer as a function of the historic purchasing data and "c(B)" is the determined average spending amount at the second business by the customer as a function of the historic purchasing data;
allocating the first portion of the total discount value as a first cost to the first business and a second portion of the total discount value as a second cost to the second business, wherein the first portion and the second portion have different values that are determined as a function of a difference in value between the first probability that the customer will purchase an item from the first business and the second probability that the customer will purchase an item from the second business; and
pushing a message comprising the generated combination discount offer to a mobile device of the customer.

2. The method of claim 1, further comprising:
presenting the combination discount offer for approval to at least one of the first business and the second business;
finalizing the combination discount offer for presentment to a consumer in response to receiving an approval of the presented combination discount offer from the at least one of the first business and the second business; and
terminating the combination discount offer from presentment in response to not receiving the approval of the presented combination discount offer from the at least one of the first business and the second business.

3. The method of claim 1, further comprising:
limiting an amount of the first portion of the total discount value allocated to the first business to a total amount spent by the customer at the first business over a specified time period.

4. The method of claim 1, wherein the commercial activity executed by the customer at the first business is selected from the group consisting of a social network service check-in activity at a geographic location of the first business, making a reservation at the first business, agreeing to pay for parking upon entry into a parking facility of the first business, entering a store of the first business, and purchasing a ticket to an event at the first business.

5. The method of claim 1, further comprising:
defining the discount grouping subset plurality as a function of determining that the discount grouping subset businesses have geographic locations that are located proximate to a predicted travel route of a consumer to the geographic location of one of the discount grouping subset businesses.

6. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the generating the combination discount offer, and the allocating the first portion of the total discount value as the first cost to the first business and the second portion of the total discount value as the second cost to the second business.

7. The method of claim 6, wherein the computer-readable program code is provided as a service in a cloud environment.

8. A system, comprising:
a first processor;
a computer readable memory in circuit communication with the first processor;
a computer readable storage medium in circuit communication with the first processor; and
a second processor in circuit communication with the first processor;
wherein the first processor executes program instructions stored on the computer-readable storage medium via the computer readable memory and thereby:
determines a plurality of discount grouping subset businesses type values by applying textual analysis to text data descriptive of a plurality of candidate businesses; and
defines a discount grouping plurality of businesses as a subset of the plurality of candidate businesses that each have complementary business type values as a function of determining common linkages to purchase data values of the determined business types within consumer purchasing event knowledge base data; and
wherein the second processor executes program instructions and thereby:
generates a combination discount offer that provides a total discount value to a customer in response to verifying that the customer executes a commercial activity at each of a first business and a second business of the discount grouping plurality of businesses, and in response to determining that it is probable as a function of historic purchasing data that the customer will purchase an item from the first business when they make a purchase from the second business;

determines average spending amounts at each of the first and the second businesses by the customer as a function of the historic purchasing data;

determines a first portion of the total discount value in an amount "f(A)" according to the expression "f(A)=c(A) p(B)/(c(A) p(B)+c(B) p(A))", wherein "p(A)" is a first probability that the customer purchases an item from the first business when the customer purchases an item from the second business, "p(b)" is a second probability that the customer purchases an item from the second business when the customer purchases an item from the first business, "c(A)" is the determined average spending amount at the first business by the customer as a function of the historic purchasing data and "c(B)" is the determined average spending amount at the second business by the customer as a function of the historic purchasing data;

allocates the first portion of the total discount value as a first cost to the first business and a second portion of the total discount value as a second cost to the second business, wherein the first portion and the second portion have different values that are determined as a function of a difference in value between the first probability that the customer will purchase an item from the first business and the second probability that the customer will purchase an item from the second business; and pushes a message comprising the generated combination discount offer to a mobile device of the customer.

9. The system of claim 8, wherein the processor executes the program instructions stored on the computer-readable storage medium via the computer readable memory and thereby:

presents the combination discount offer for approval to at least one of the first business and the second business;

finalizes the combination discount offer for presentment to a consumer in response to receiving an approval of the presented combination discount offer from the at least one of the first business and the second business; and terminates the combination discount offer from presentment in response to not receiving the approval of the presented combination discount offer from the at least one of the first business and the second business.

10. The system of claim 8, wherein the commercial activity executed by the customer at the first business is selected from the group consisting of a social network service check-in activity at a geographic location of the first business, making a reservation at the first business, agreeing to pay for parking upon entry into a parking facility of the first business, entering a store of the first business, and purchasing a ticket to an event at the first business.

11. A computer program product for dynamic consumer incentive generation, the computer program product comprising:

a computer readable storage medium having computer readable program code embodied therewith, the computer readable program code comprising instructions for execution by a processor that cause the processor to:

determine a plurality of discount grouping subset businesses type values by applying textual analysis to text data descriptive of a plurality of candidate businesses;

define a discount grouping plurality of businesses as a subset of the plurality of candidate businesses that each have complementary business type values as a function of determining common linkages to purchase data values of the determined business types within consumer purchasing event knowledge base data;

generate a combination discount offer that provides a total discount value to a customer in response to verifying that the customer executes a commercial activity at each of a first business and a second business of the discount grouping plurality of businesses, and in response to determining that it is probable as a function of historic purchasing data that the customer will purchase an item from the first business when they make a purchase from the second business;

determine average spending amounts at each of the first and the second businesses by the customer as a function of the historic purchasing data;

determine a first portion of the total discount value in an amount "f(A)" according to the expression "f(A)=c(A) p(B)/(c(A) p(B)+c(B) p(A))", wherein "p(A)" is a first probability that the customer purchases an item from the first business when the customer purchases an item from the second business, "p(b)" is a second probability that the customer purchases an item from the second business when the customer purchases an item from the first business, "c(A)" is the determined average spending amount at the first business by the customer as a function of the historic purchasing data and "c(B)" is the determined average spending amount at the second business by the customer as a function of the historic purchasing data;

allocate the first portion of the total discount value as a first cost to the first business and a second portion of the total discount value as a second cost to the second business, wherein the first portion and the second portion have different values that are determined as a function of a difference in value between the first probability that the customer will purchase an item from the first business and the second probability that the customer will purchase an item from the second business; and push a message comprising the generated combination discount offer to a mobile device of the customer.

12. The computer program product of claim 11, wherein the computer readable program code instructions for execution by the processor further cause the processor to:

present the combination discount offer for approval to at least one of the first business and the second business;

finalize the combination discount offer for presentment to a consumer in response to receiving an approval of the presented combination discount offer from the at least one of the first business and the second business; and terminate the combination discount offer from presentment in response to not receiving the approval of the presented combination discount offer from the at least one of the first business and the second business.

13. The computer program product of claim 11, wherein the commercial activity executed by the customer at the first business is selected from the group consisting of a social network service check-in activity at a geographic location of the first business, making a reservation at the first business, agreeing to pay for parking upon entry into a parking facility of the first business, entering a store of the first business, and purchasing a ticket to an event at the first business.

* * * * *